(12) United States Patent
Greve

(10) Patent No.: US 11,205,183 B1
(45) Date of Patent: Dec. 21, 2021

(54) RECALLED ITEM NOTIFICATION SYSTEM INCLUDING VIRTUAL SHOPPING CART PRODUCT REMOVAL AND RELATED METHODS

(71) Applicant: INMAR SUPPLY CHAIN SOLUTIONS, LLC, Winston-Salem, NC (US)

(72) Inventor: Michael Curtis Greve, Clemmons, NC (US)

(73) Assignee: INMAR SUPPLY CHAIN SOLUTIONS, LLC, Winston-Salem, NC (US)

( * ) Notice: Subject to any disclaimer, the term of this patent is extended or adjusted under 35 U.S.C. 154(b) by 545 days.

(21) Appl. No.: 15/991,040

(22) Filed: May 29, 2018

(51) Int. Cl.
  *G06Q 30/00* (2012.01)
  *G06Q 30/02* (2012.01)
  *G06Q 30/06* (2012.01)

(52) U.S. Cl.
  CPC ....... *G06Q 30/014* (2013.01); *G06Q 30/0251* (2013.01); *G06Q 30/0623* (2013.01)

(58) Field of Classification Search
  CPC ........... G06Q 30/0601; G06Q 30/0633; G06Q 30/0637; G06Q 30/014; G06Q 30/027; G06Q 30/0211; G06Q 30/0222; G06Q 30/0238; G06Q 30/0239
  See application file for complete search history.

(56) References Cited

U.S. PATENT DOCUMENTS

| | | | | |
|---|---|---|---|---|
| 2008/0065485 | A1* | 3/2008 | Hammond | G06Q 30/02 705/14.25 |
| 2009/0032589 | A1* | 2/2009 | Bowlus | G06Q 30/06 235/383 |
| 2009/0144104 | A1 | 6/2009 | Johnson | |
| 2010/0280963 | A1* | 11/2010 | Fordyce, III | G06Q 10/10 705/303 |
| 2013/0030899 | A1* | 1/2013 | Ehlers | G06Q 30/06 705/14.23 |
| 2013/0117187 | A1 | 5/2013 | Small | |

OTHER PUBLICATIONS

Britannica, SKU, www.britannica.com/technology/SKU, Aug. 27, 2009 (Year: 2009).*
"Retailers Must Prevent Sales of Recalled Products", Schiffhardin. com, Oct. 12, 2017 (Year: 2017).*

* cited by examiner

*Primary Examiner* — Dennis W Ruhl
(74) *Attorney, Agent, or Firm* — Allen, Dyer, Doppelt, + Gilchrist, P.A.

(57) ABSTRACT

A recalled item notification system may include a retailer server configured to operate a virtual shopping cart for products to be purchased by a purchaser. Each product may have an associated product identifier. The system may also include a recalled item server configured to, when a product for purchase is in the virtual shopping cart, obtain the associated product identifier for the product and determine if the product is subject to a recall based upon the product identifier. When it is determined that the product is subject to a recall, the recalled item server is configured to communicate with the retailer server to remove the product from the virtual shopping cart, and generate a notification that the product is subject to the recall and that the product has been removed from the virtual shopping cart.

19 Claims, 5 Drawing Sheets

RECALLED ITEM NOTIFICATION SYSTEM INCLUDING VIRTUAL SHOPPING CART PRODUCT REMOVAL AND RELATED METHODS

TECHNICAL FIELD

The present application is directed to the field of electronics, and more particularly, to virtual shopping cart processing and related methods.

BACKGROUND

Online shopping is a form of shopping where a purchaser or buyer can, using a computer, purchase products from a seller or online retailer, typically over the Internet. Typically, a purchaser visits a retailer's or seller's website to locate, search, and pay for desired products.

Similar to a typical brick-and-mortar retailer or physical retailer, an online retailer permits a purchaser to select multiple products for purchase and place those products in a shopping cart for subsequent checkout. The shopping cart of an online retailer is a virtual shopping cart. When a purchaser is desirous of purchasing the products in his or her virtual shopping cart, the purchaser begins the checkout process which includes providing billing and payment information and shipping information.

A product recall is a request, for example, made by a product manufacturer or government agency, to discontinue the use of a product (e.g., return or destroy). The product subject to the recall may have a defect associated with it that caused the recall. Relatively quick notification of a recalled product may be particularly desirable to reduce potential negative effects that may occur as a result of use of the recalled product.

SUMMARY

A recalled item notification system may include a retailer server configured to operate a virtual shopping cart for products to be purchased by a purchaser. Each product may have an associated product identifier. The system may also include a recalled item server configured to, when a product for purchase is in the virtual shopping cart, obtain the associated product identifier for the product and determine if the product is subject to a recall based upon the product identifier. When it is determined that the product is subject to a recall, the recalled item server is configured to communicate with the retailer server to remove the product from the virtual shopping cart, and generate a notification that the product is subject to the recall and that the product has been removed from the virtual shopping cart.

The recalled item server may be configured to generate a digital promotion for another product based upon removal of the product from the virtual shopping cart. The recalled item server may be configured to generate the digital promotion based upon the associated product identifier of the product, for example.

The recalled item server may be configured to determine if the product is subject to a recall responsive to the product being placed in the virtual shopping cart, for example. The recalled item server may be configured to determine if the product is subject to a recall responsive to checkout of the virtual shopping cart, for example.

The recalled item server may be configured to communicate the notification to a retailer of the product. The recalled item server may be configured to communicate the notification to a third party seller of the product.

The product identifier may include a product description, for example. The product identifier may include universal product code (UPC), or a stock keeping unit (SKU).

A method aspect is directed to a method of processing products to be purchased by a purchaser in a virtual shopping cart using a recalled item notification system that includes a retailer server configured to operate the virtual shopping cart for the products to be purchased by the purchaser. Each product may have an associated product identifier. The method may include using a recalled item server to, when a product for purchase is in the virtual shopping cart, obtain the associated product identifier for the product and determine if the product is subject to a recall based upon the product identifier. When it is determined that the product is subject to a recall, the recalled item server may communicate with the retailer server to remove the product from the virtual shopping cart, and generate a notification that the product is subject to the recall and that the product has been removed from the virtual shopping cart.

A computer readable medium aspect is directed to a non-transitory computer readable medium for a recalled item server of a recalled item notification system that includes a retailer server configured to operate a virtual shopping cart for products to be purchased by a purchaser. Each product has an associated product identifier. The non-transitory computer readable medium includes computer executable instructions that when executed by a processor of the recalled item server cause the processor to perform operations. The operations may include, when a product for purchase is in the virtual shopping cart, obtaining the associated product identifier for the product and determining if the product is subject to a recall based upon the product identifier. The operations may also include, when the product is determined to be subject to a recall, communicating with the retailer server to remove the product from the virtual shopping cart, and generating a notification that the product is subject to the recall and that the product has been removed from the virtual shopping cart.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1A:
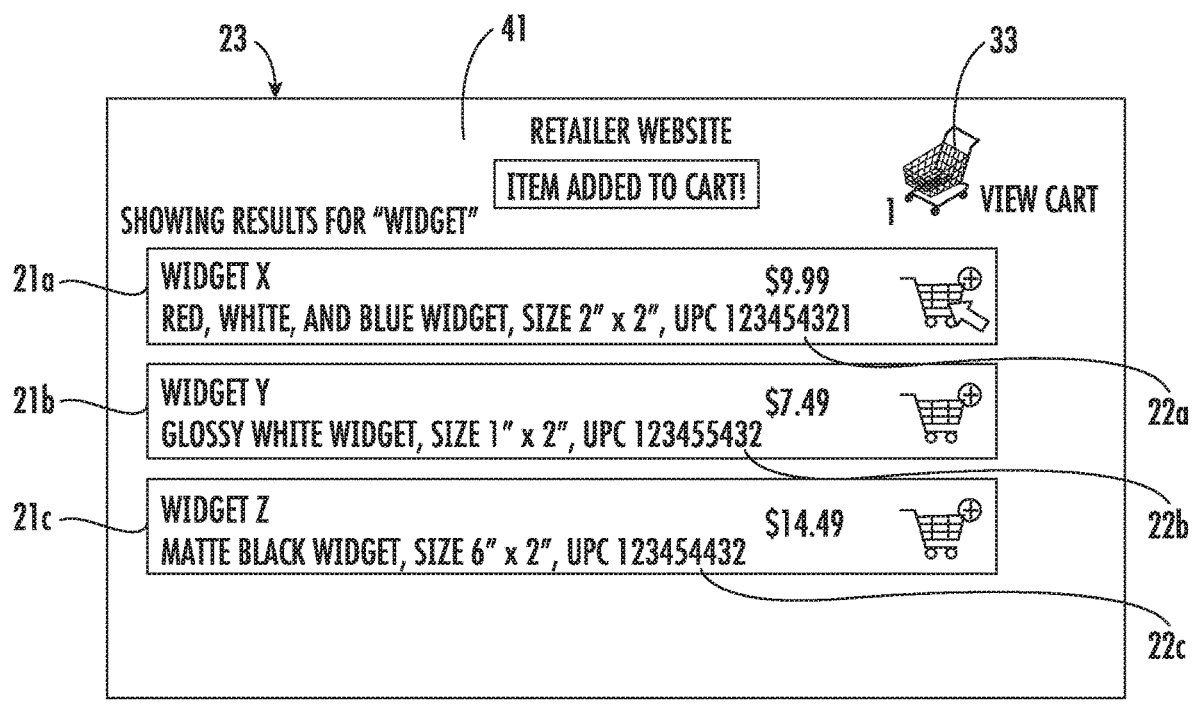
FIG. 1A is a diagram of an exemplary purchaser interface in a recalled item notification system according to an embodiment.
Figure 1B:
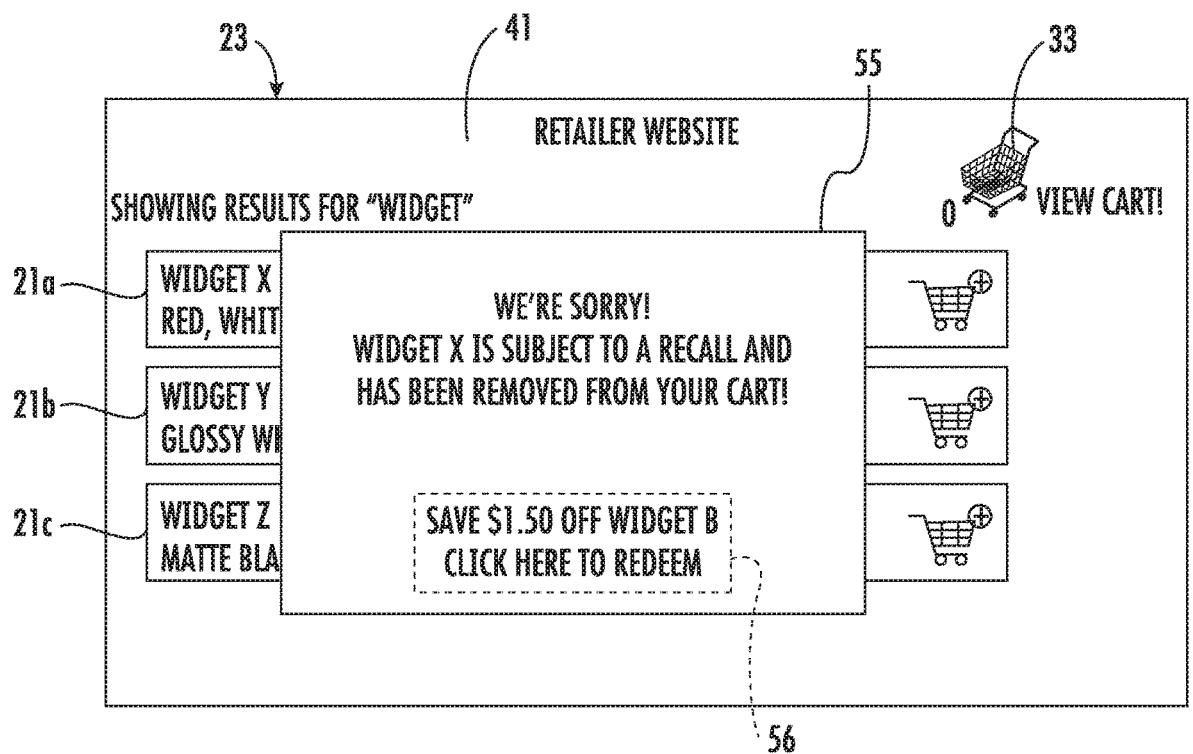
FIG. 1B is another diagram of an exemplary purchaser interface in a recalled item notification system according to an embodiment.
Figure 2:
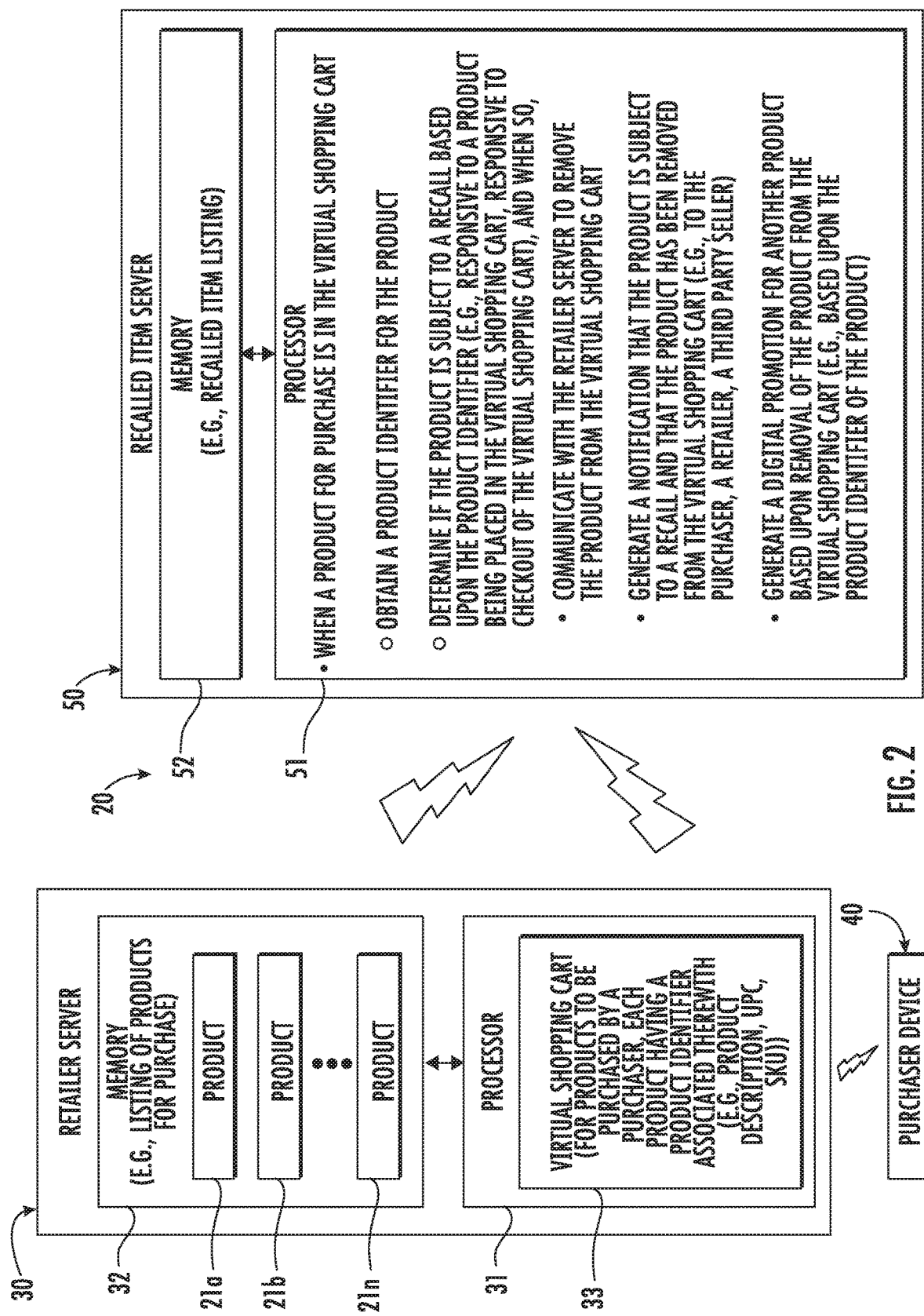
FIG. 2 is a schematic block diagram of a recalled item notification system according to an embodiment.

Referring initially to FIGS. 1A-2, a recalled item notification system 20 includes a retailer server 30. The retailer server 30 includes a retailer server processor 31 and a retailer server memory 32 coupled to the retailer server processor. The retailer server processor 31 and memory 32 cooperate to operate a virtual shopping cart 33 for products 21a-21n to be purchased by a purchaser. In other words, the retailer server may operate as an electronic commerce platform, (e.g., website) or online storefront 23 for online shopping (FIG. 1A), as will be appreciated by those skilled in the art. A listing of available products for sale by the retailer or a third party seller (i.e., the retailer may facilitate the actual purchase transaction) may be stored in the retailer server memory 32. Each product 21a-21n has a product identifier 22a-22n associated therewith. More particularly, each product 21a-21n may have a product description, UPC, and/or SKU associated therewith. Of course, each product 21a-21n may have one or more other and/or additional identifiers associated therewith, for example, an item number.

The purchaser, through the user of a purchaser device 40, and more particularly, an interface 41 such as a display, cooperates with the retailer server 30, for example, over a network, such as the Internet, for shopping and to make online purchases. The purchaser device 40 may be a personal computer, tablet, mobile device or smartphone, or other mobile wireless communications device. As will be appreciated by those skilled in the art, through cooperation of the purchaser device 40 and the retailer server 30, the purchaser may select items for purchase 21a-21n, add and remove items for purchase to the virtual shopping cart 33, and upon completion of shopping, checkout or complete the online transaction or purchase for items in the virtual shopping cart.

The recalled item notification system 20 also includes a recalled item server 50. The recalled item server 50 includes a recalled item processor 51 and a recalled item memory 52 cooperating with the recalled item processor.

Figure 3:
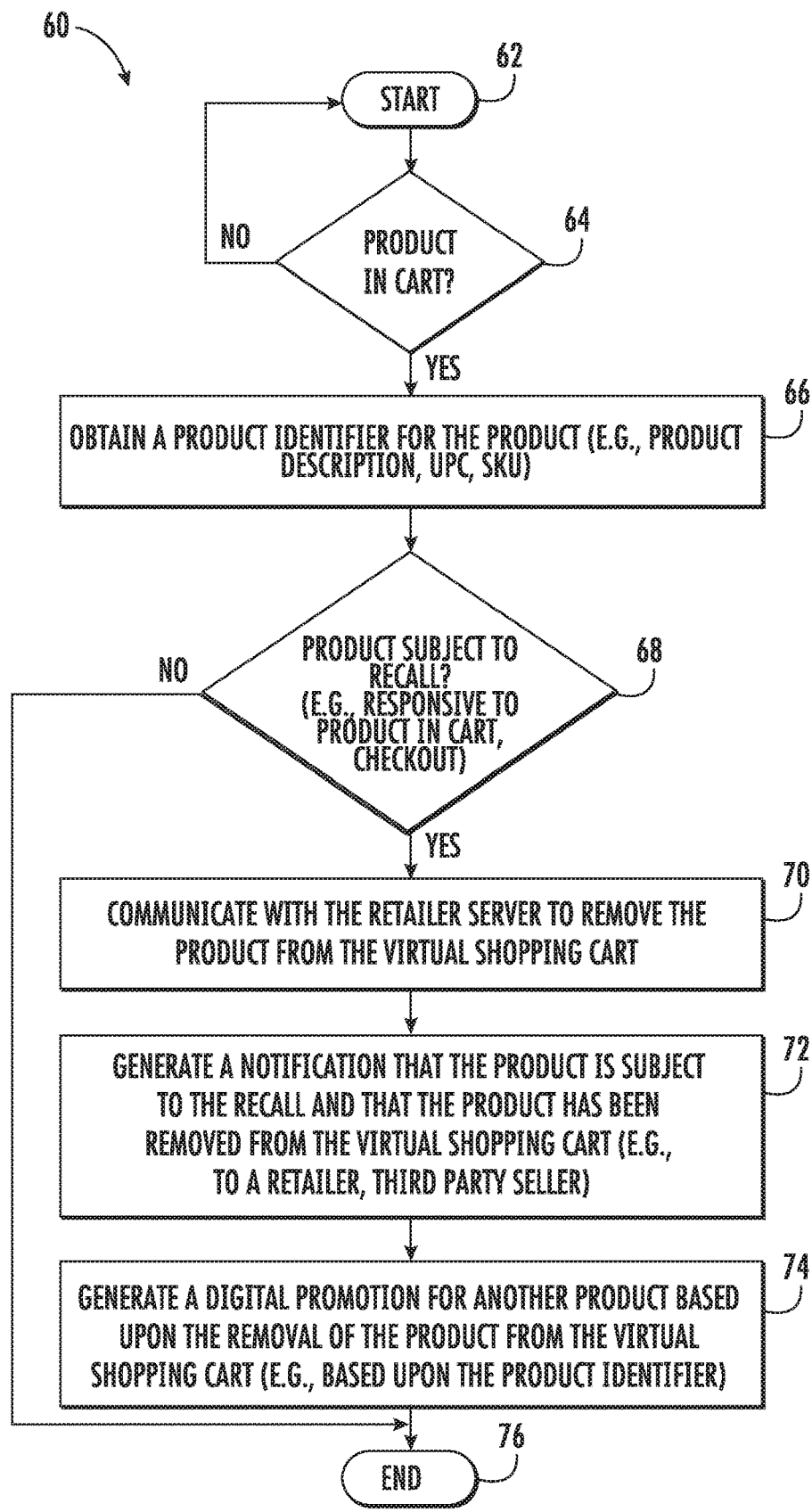
FIG. 3 is a flow diagram illustrating operation of the recalled item notification system of FIG. 2.

Referring now additionally to the flowchart 60 in FIG. 3, beginning at Block 62, operation of the recalled item notification system 20 will now be described. At Block 64, the recalled item server 50 determines when a product for purchase is in the virtual shopping cart 33. More particularly, in some embodiments, the retail server 30 may communicate the existence of a product in the virtual shopping cart 33 upon placement of the product for purchase in the virtual shopping cart. Other and/or additional techniques may be used to determine whether a product for purchase is in the virtual shopping cart 33. If, at Block 64, no products for purchase are in the virtual shopping cart, the system 20 or recalled item server 50 may poll for a product being added to the virtual shopping cart 33.

At Block 66, when a product for purchase is in the virtual shopping cart 33, for example, responsive to the product being placed in the virtual shopping cart (FIG. 1A), the recalled item server 50 obtains the corresponding product identifier 22a-22n of the product or products in the virtual shopping cart 33. More particularly, the product description, UPC, and/or SKU of the product in the virtual shopping cart 33 may be communicated from the retailer server 30 to the recalled item server 50 or retrieved from the retailer server (e.g., using a browser plugin). Of course, the recalled item server 50 may employ other techniques for obtaining the product identifier 22a-22n for the product in the virtual shopping cart 33.

At Block 68, the recalled item server 50, for example, upon obtaining the product identifier(s) at Block 66, determines if the product is subject to a recall based upon the product identifier 22a-22n. The recalled item server 50 may store, for example, in the memory 52, a listing of product identifiers 22a-22n corresponding to recalled products for matching with the product identifier corresponding the product for purchase in the virtual shopping cart 33. In some embodiments, the recalled item server 50 may communicate with a remote server, for example, a governmental agency server including a database of recalled items, for retrieval or query.

When, at Block 68, it is determined that the product for purchase in the virtual shopping cart 33 is subject to a recall, the recalled item server 50 communicates with the retailer server 30 to remove the product from the virtual shopping cart (Block 70) and generates a notification 55 that the product is subject to a recall and that the product has been removed from the virtual shopping cart (Block 72) (FIG. 1B). More particularly, the recalled item server 50 cooperates so that the product for purchase 21a-21n placed by the purchaser in the virtual shopping cart 33 is removed therefrom and so that the purchaser cannot complete the transaction to purchase the recalled product (Block 70). As shown in FIG. 1B, the notification 55 may be communicated to the purchaser at the purchaser device 40 and may be in the form of a pop-up window that appears on the display 41 of the purchaser device, an email, a text message, a badge, or other type of notification.

The recalled item server 50 may alternatively or additionally communicate the notification 55 to the retailer. The recalled item server 50 may also alternatively or additionally communicate the notification 55, in the case where the retailer is merely a reseller for a third party seller, to the third party seller. The notification 55 to the retailer and/or third party reseller may be in the form of any one or more of an email, text or short message service message, sales report, etc.

At Block 74, the recalled item server 50 generates a digital promotion 56 for another product based upon the removal of the product from the virtual shopping cart 33. More particularly, the recalled item server 50 generates the digital promotion 56 based upon the product identifier 22a-22n of the product removed from the virtual shopping cart 33, for example, the family code of the UPC (FIG. 1B). As will be appreciated by those skilled in the art, by generating a digital promotion 56, a purchaser may be compensated for the inconvenience of having a desired and recalled product 21a-21n removed from the virtual shopping cart 33. Overall user happiness may also be maintained. The process ends at Block 76.

Figure 4:
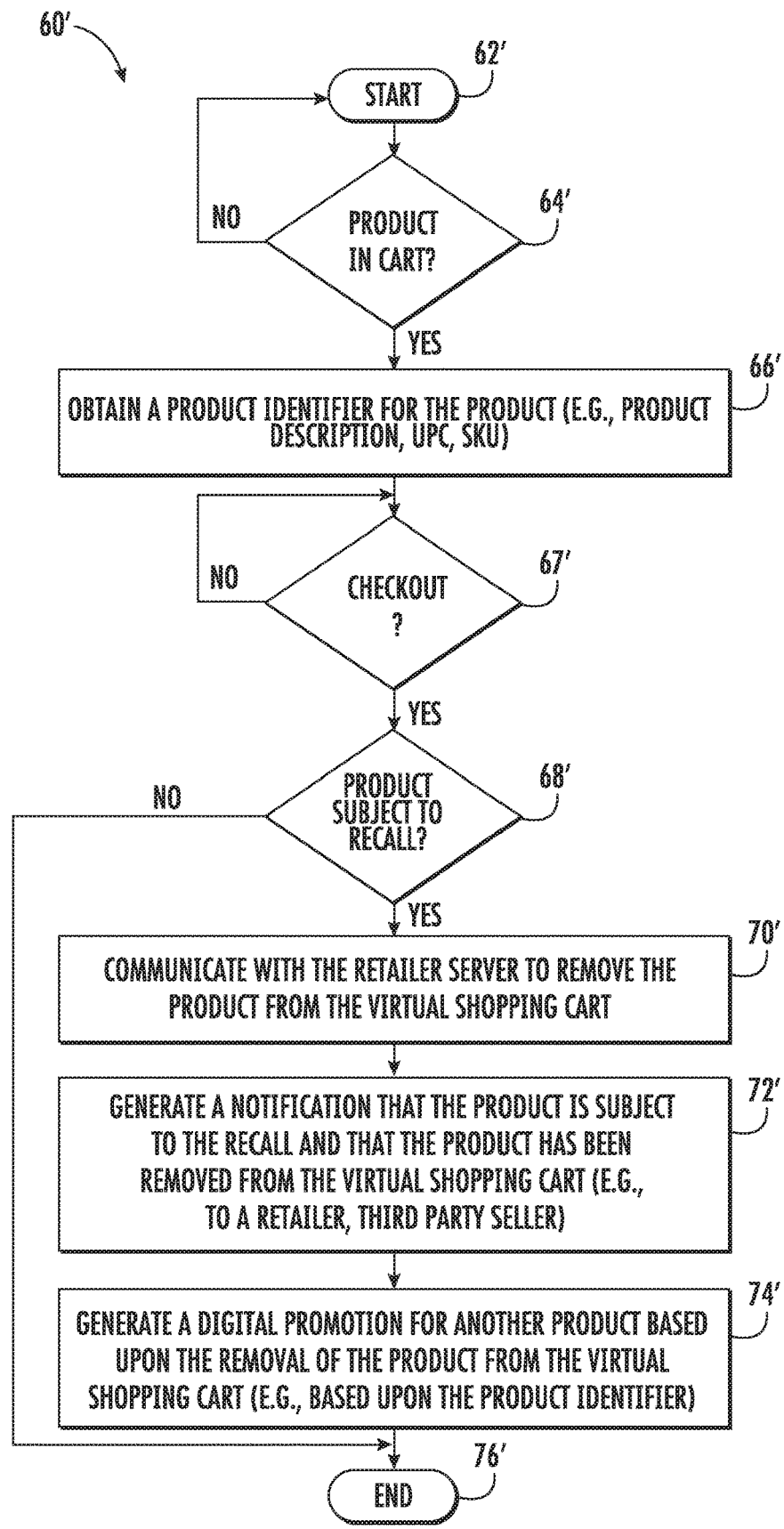
FIG. 4 is a flow diagram illustrating operation of a recalled item notification system according to an embodiment.

Referring now to the flowchart 60' in FIG. 4, beginning at Block 62', operation of the recalled item notification system 20 according to another embodiment will now be described. At Block 64', the recalled item server 50 determines when a product 21a-21n for purchase is in the virtual shopping cart 33. The determination of whether a product is in the virtual shopping cart 33 may be made based upon viewing by the purchaser of the virtual shopping cart, and/or adding to or removing items from the virtual shopping cart.

At Block 66', when a product for purchase is in the virtual shopping cart 33, the recalled item server 50 obtains the corresponding product identifier 22a-22n of the product 21a-21n or products in the virtual shopping cart 33, for example, along the lines described above. At Block 67', the recalled item server 50, upon obtaining the product identifier(s) 22a-22n at Block 66', determines whether checkout of the virtual shopping cart 33 has begun. Responsive to checkout of the virtual shopping cart 33 at Block 68', the recalled item server 50 determines if the product is subject to a recall based upon the product identifier.

When, at Block 68', it is determined that the product 21a-21n for purchase in the virtual shopping cart 33 is subject to a recall, the recalled item server 50 communicates with the retailer server 30 to remove the product from the virtual shopping cart (Block 70') and generates one or more notifications (Block 72') and, optionally a digital promotion (Block 74') as described above before ending at Block 76'. As will be appreciated by those skilled in the art, in the present embodiment, the recalled item server 50 stores or queues product identifiers 22a-22n of products 21a-21n in the virtual shopping cart 33, but does not determine if the product or products in the virtual shopping cart are subject to a recall until checkout of the virtual shopping cart.

While multiple embodiments have been described with respect to the timing and operations, those skilled in the art will appreciate that elements from any embodiment may be combined with other elements from different embodiments. For example, in some embodiments, the recalled item server 50 may determine whether a product 21a-21n is subject to a recall after each product is added to the virtual shopping cart 33 or may wait until checkout. The recalled item server 50 may also, in some embodiments, obtain, for example, retrieve, data indicative of the existence of a product 21a-21n in the virtual shopping cart 33, for example, by polling. A browser plugin, which may be an extension of the recalled item server 50, may be installed and executed by the purchaser device 40 and be operative to obtain the existence of a product 21a-21n in the virtual shopping cart 33.

A method aspect is directed to a method of processing products 21a-21n to be purchased by a purchaser in a virtual shopping cart 33 using a recalled item notification system 20 that includes a retailer server 30 configured to operate the virtual shopping cart for the products to be purchased by the purchaser. Each product 21a-21n has a product identifier associated therewith. The method includes using a recalled item server 50 to, when a product 21a-21n for purchase is in the virtual shopping cart 33, obtain a product identifier 22a-22n for the product and determine if the product is subject to a recall based upon the product identifier. When it is determined that the product 21a-21n is subject to a recall, the recalled item server 50 may communicate with the retailer server 30 to remove the product 21a-21n from the virtual shopping cart 33 and generate a notification 55 that the product is subject to the recall and that the product has been removed from the virtual shopping cart.

A computer readable medium aspect is directed to a non-transitory computer readable medium for a recalled item server 50 of a recalled item notification system 20 that includes a retailer server 30 configured to operate a virtual shopping cart 33 for products 21a-21n to be purchased by a purchaser. Each product has a product identifier 22a-22n associated therewith. The non-transitory computer readable medium includes computer executable instructions that when executed by a processor 51 of the recalled item server 50 cause the processor to perform operations. The operations include, when a product 21a-21n for purchase is in the virtual shopping cart 33, obtaining a product identifier 22a-22n for the product and determining if the product is subject to a recall based upon the product identifier. The operations also include, when the product 21a-21n is determined to be subject to a recall, communicating with the retailer server 30 to remove the product from the virtual shopping cart 33, and generating a notification 55 that the product is subject to the recall and that the product has been removed from the virtual shopping cart.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A recalled item notification system comprising:
    a purchaser device associated with a given purchaser and configured to operate a web browser application having a recalled product plugin associated therewith;
    a retailer server associated with a retailer and configured to
    permit a third party seller to sell products made by a manufacturer to be purchased via an online storefront associated with the retailer so that the retailer is a reseller of the products, and
    operate the online storefront including a virtual shopping cart permitting the given purchaser, through operation of the purchaser device, to add or remove the products to be purchased via the online storefront, each product having an associated product identifier; and
    a recalled item server configured to cooperate via the recalled product plugin to, when a product for purchase is in the virtual shopping cart,
    obtain the associated product identifier for the product, and
    determine if the product is subject to a recall based upon the associated product identifier, and when so,
    communicate with the retailer server to remove the product from the virtual shopping cart,
    generate a notification that the product is subject to the recall and that the product has been removed from the virtual shopping cart,
    communicate the notification to the third party seller and the retailer,
    generate a digital promotion for another product based upon removal of the product from the virtual shopping cart, and
    communicate the notification to the purchaser device so that the notification with the digital promotion is displayed on a display of the purchaser device within a pop-up window overlapping a storefront window, the digital promotion being user-selectable for redemption.

2. The system of claim 1 wherein the recalled item server is configured to generate the digital promotion based upon the associated product identifier of the product.

3. The system of claim 1 wherein the recalled item server is configured to determine if the product is subject to a recall responsive to the product being placed in the virtual shopping cart.

4. The system of claim 1 wherein the recalled item server is configured to determine if the product is subject to a recall responsive to checkout of the virtual shopping cart.

5. The system of claim 1 wherein the associated product identifier comprises a product description.

6. The system of claim 1 wherein the associated product identifier comprises a universal product code (UPC).

7. The system of claim 1 wherein the associated product identifier comprises a stock keeping unit (SKU).

8. A recalled item server for a recalled item notification system comprising:
a purchaser device associated with a given purchaser and configured to operate a web browser application having a recalled product plugin associated therewith, and a retailer server associated with a retailer and configured to permit a third party seller to sell products made by a manufacturer to be purchased via an online storefront associated with the retailer so that the retailer is a reseller of the products, and operate the online storefront including a virtual shopping cart permitting the given purchaser, through operation of the purchaser device, to add or remove the products to be purchased via the online storefront, each product having an associated product identifier, the recalled item server comprising:
a processor and a memory tar cooperating therewith to cooperate via the recalled product plugin, when a product for purchase is in the virtual shopping cart,
obtain the associated product identifier for the product, and
determine if the product is subject to a recall based upon the associated product identifier, and when so,
communicate with the retailer server to remove the product from the virtual shopping cart,
generate a notification that the product is subject to the recall and that the product has been removed from the virtual shopping cart,
communicate the notification to the third party seller and the retailer,
generate a digital promotion for another product based upon removal of the product from the virtual shopping cart, and
communicate the notification to the purchaser device so that the notification with the digital promotion is displayed on a display of the purchaser device within a pop-up window overlapping a storefront window, the digital promotion being user-selectable for redemption.

9. The recalled item server of claim 8 wherein the processor is configured to generate the digital promotion based upon the associated product identifier of the product.

10. The recalled item server of claim 8 wherein the processor is configured to determine if the product is subject to a recall responsive to the product being placed in the virtual shopping cart.

11. The recalled item server of claim 8 wherein the processor is configured to determine if the product is subject to a recall responsive to checkout of the virtual shopping cart.

12. The recalled item server of claim 8 wherein the associated product identifier comprises at least one of a product description, a universal product code (UPC), and a stock keeping unit (SKU).

13. A method of processing products to be purchased by a purchaser in a virtual shopping cart using a recalled item notification system comprising a purchaser device associated with a given purchaser and configured to operate a web browser application having a recalled product plugin associated therewith, and a retailer server associated with a retailer and configured to permit a third party seller to sell products made by a manufacturer be purchased via an online storefront associated with the retailer so that the retailer is a reseller of the products, and operate the online storefront including the virtual shopping cart permitting the given purchaser, through operation of the purchaser device, to add or remove the products to be purchased via the online storefront, each product having an associated product identifier, the method comprising:
using a recalled item server to cooperate via the recalled product plugin to, when a product for purchase is in the virtual shopping cart,
obtain the associated product identifier for the product, and
determine if the product is subject to a recall based upon the associated product identifier, and when so,
communicate with the retailer server to remove the product from the virtual shopping cart,
generate a notification that the product is subject to the recall and that the product has been removed from the virtual shopping cart,
communicate the notification to the third party seller and the retailer,
generate a digital promotion for another product based upon removal of the product from the virtual shopping cart, and
communicate the notification to the purchaser device so that the notification with the digital promotion is displayed on a display of the purchaser device within a pop-up window overlapping a storefront window, the digital promotion being user-selectable for redemption.

14. The method of claim 13 wherein using the recalled item server comprises using the recalled item server to generate the digital promotion based upon the associated product identifier of the product.

15. The method of claim 13 wherein using the recalled item server comprises using the recalled item server to determine if the product is subject to a recall responsive to the product being placed in the virtual shopping cart.

16. The method of claim 13 wherein using the recalled item server comprises using the recalled item server to determine if the product is subject to a recall responsive to checkout of the virtual shopping cart.

17. A non-transitory computer readable medium for a recalled item server of a recalled item notification system comprising a purchaser device associated with a given purchaser and configured to operate a web browser application having a recalled product plugin associated therewith, and a retailer server associated with a retailer and configured to permit a third party seller to sell products made by a manufacturer to be purchased via an online storefront associated with the retailer so that the retailer is a reseller of the products, and operate the online storefront including a virtual shopping cart permitting the given purchaser, through operation of the purchaser device, to add or remove the products to be purchased via the online storefront, each product having an associated product identifier, the non-transitory computer readable medium comprising computer executable instructions that when executed by a processor of the recalled item server cause the processor to cooperate via the recalled product plugin to perform operations comprising, when a product for purchase is in the virtual shopping cart:
obtaining the associated product identifier for the product; and
determining if the product is subject to a recall based upon the associated product identifier, and when so,
communicating with the retailer server to remove the product from the virtual shopping cart,
generating a notification that the product is subject to the recall and that the product has been removed from the virtual shopping cart,
communicating the notification to the third party seller and the retailer, generating a digital promotion for another product based upon removal of the product from the virtual shopping cart, and communicating the notification to the purchaser device so that the notification with the digital promotion is displayed on a display of the purchaser device within a pop-up window overlapping a storefront window, the digital promotion being user-selectable for redemption.

18. The non-transitory computer readable medium of claim 17 wherein the operations comprise generating the digital promotion based upon the associated product identifier of the product.

19. The non-transitory computer readable medium of claim 17 wherein the operations comprise determining if the product is subject to a recall responsive to the product being placed in the virtual shopping cart.

* * * * *

UNITED STATES PATENT AND TRADEMARK OFFICE
CERTIFICATE OF CORRECTION

| | | |
|---|---|---|
| PATENT NO. | : 11,205,183 B1 | Page 1 of 1 |
| APPLICATION NO. | : 15/991040 | |
| DATED | : December 21, 2021 | |
| INVENTOR(S) | : Greve | |

It is certified that error appears in the above-identified patent and that said Letters Patent is hereby corrected as shown below:

In the Claims

Column 7, Line 17      Delete: "tar"
                       Insert: --for--

Signed and Sealed this
Thirty-first Day of May, 2022

Katherine Kelly Vidal
*Director of the United States Patent and Trademark Office*